(12) United States Patent
Arias

(10) Patent No.: US 12,086,729 B2
(45) Date of Patent: *Sep. 10, 2024

(54) ARCHITECTURE FOR REFINING MAPPED HUMAN EXPERIENCES INSIGHTS WITHIN A HUMAN EXPERIENCE FLOW

(71) Applicant: Dell Products L.P., Round Rock, TX (US)

(72) Inventor: Alberto Arias, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/239,580

(22) Filed: Aug. 29, 2023

(65) Prior Publication Data
US 2023/0409933 A1 Dec. 21, 2023

Related U.S. Application Data

(63) Continuation of application No. 16/917,820, filed on Jun. 30, 2020, now Pat. No. 11,748,637.

(51) Int. Cl.
G06F 15/16 (2006.01)
G06N 5/04 (2023.01)
G06N 20/00 (2019.01)

(52) U.S. Cl.
CPC ............ *G06N 5/04* (2013.01); *G06N 20/00* (2019.01)

(58) Field of Classification Search
None
See application file for complete search history.

(56) References Cited

U.S. PATENT DOCUMENTS

| 7,315,826 B1 * | 1/2008 | Guheen .............. G06Q 30/0201 705/7.29 |
| 9,921,900 B1 | 3/2018 | Schwartz |
| 10,157,347 B1 | 12/2018 | Kasturi et al. |

(Continued)

FOREIGN PATENT DOCUMENTS

| WO | 2007092781 A3 | 8/2007 |
| WO | 2018002731 A2 | 3/2018 |

OTHER PUBLICATIONS

Lee et al., A Structural Model for Unity of Experience: Connecting User Experience, Customer Experience, and Brand Experience, Nov. 2018, Journal of Usability Studies, vol. 14, Issue 1, pp. 8-34 (Year: 2018).

(Continued)

*Primary Examiner* — Phuoc H Nguyen
(74) *Attorney, Agent, or Firm* — Terrile, Cannatti & Chambers, LLP; Stephen A. Terrile

(57) ABSTRACT

A system, method, and computer-readable medium are disclosed for performing a human experience operation. The human experience operation includes receiving standardized human experience concepts and categorized human experience concepts; performing an analysis operation, the analysis engine receiving the categorized corresponding concepts and mapping the categorized human experience concepts to human experience enhancement objectives to provide a mapped human experience insight; and, providing the mapped human experience insight to a results engine, the results engine using the mapped human experience insight generate a human experience recommendation.

20 Claims, 10 Drawing Sheets

(56) References Cited

U.S. PATENT DOCUMENTS

| | | |
|---|---|---|
| 11,023,953 B1 | 6/2021 | Furlan et al. |
| 11,863,578 B1* | 1/2024 | Speck .................... G06N 5/01 |
| 2006/0085255 A1* | 4/2006 | Hastings ................ G06Q 30/02 |
| | | 705/14.4 |
| 2010/0138282 A1 | 6/2010 | Kannan et al. |
| 2013/0132299 A1* | 5/2013 | Lin, Jr. ................. G06Q 10/10 |
| | | 705/348 |
| 2013/0282430 A1 | 10/2013 | Kannan et al. |
| 2013/0342538 A1 | 12/2013 | Kozine et al. |
| 2014/0089040 A1 | 3/2014 | Nandan et al. |
| 2014/0278786 A1* | 9/2014 | Liu-Qiu-Yan ...... G06Q 30/0251 |
| | | 705/7.32 |
| 2014/0279987 A1 | 9/2014 | Chico de Guzman Huerta et al. |
| 2017/0308917 A1 | 10/2017 | Winters et al. |
| 2018/0165723 A1 | 6/2018 | Wright et al. |
| 2018/0285756 A1 | 10/2018 | Dunwoody |
| 2019/0102706 A1 | 4/2019 | Frank et al. |
| 2019/0244225 A1 | 8/2019 | Ravichandran |
| 2019/0294720 A1 | 9/2019 | Beringer et al. |
| 2019/0332785 A1* | 10/2019 | AthuluruTlrumala ...................... |
| | | H04W 8/005 |
| 2019/0377818 A1 | 12/2019 | Andritsos |
| 2019/0387998 A1 | 12/2019 | Garten et al. |
| 2020/0074333 A1 | 3/2020 | Bandyopadhyay et al. |
| 2020/0154235 A1 | 5/2020 | Jadav et al. |
| 2020/0160231 A1* | 5/2020 | Asthana ............. G06F 16/9024 |
| 2020/0279629 A1* | 9/2020 | Morrissey .............. G16H 10/60 |
| 2020/0293036 A1 | 9/2020 | Cella |
| 2020/0349581 A1 | 11/2020 | Petluru et al. |
| 2020/0364588 A1* | 11/2020 | Knox .................... G06V 40/20 |
| 2021/0089624 A1 | 3/2021 | Bealby-Wright et al. |
| 2021/0118073 A1 | 4/2021 | Brisimi et al. |
| 2021/0201359 A1 | 7/2021 | Sekar et al. |
| 2021/0303793 A1 | 9/2021 | Wang et al. |
| 2024/0144055 A1* | 5/2024 | Soon-Shiong ......... G06N 5/043 |

OTHER PUBLICATIONS

Yu et al., Co-management of brand identity and customer experiences (Year: 2008).

Tong et al., Empirical study on customer satisfaction influencing factors of industry application products based on experiential level theory (Year: 2016).

Julia Kokina et al., The role of data visualization and analytics in performance management: Guiding entrepreneurial growth decisions, 2017, Elsevier, Journal of Accounting Education 38, pp. 50-62 (Year: 2017).

Seth Earley, The Role of a Customer Data Platform, IT Professional 2018, Feb. 14, 2018 (Year: 2018).

Gilles Beaudon et al., Datum Based Event Mining: The Case of Customer Experience in Insurance, 2018 International Conference on Computational Science and Computational Intelligence (CSCI), Dec. 12-14, 2018 (Year: 2018).

Lam et al., Optimizing Customer-Agent Interactions with Natural Language Processing and Machine Learning (Year: 2019).

* cited by examiner

ARCHITECTURE FOR REFINING MAPPED HUMAN EXPERIENCES INSIGHTS WITHIN A HUMAN EXPERIENCE FLOW

BACKGROUND OF THE INVENTION

Field of the Invention

The present invention relates to information handling systems. More specifically, embodiments of the invention relate to enhancing a customer's experience with an organization during the lifecycle of their relationship.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

SUMMARY OF THE INVENTION

A system, method, and computer-readable medium are disclosed for performing a human experience operation.

More specifically, in one embodiment the invention relates to a method for performing a human experience operation, comprising: receiving standardized human experience concepts and categorized human experience concepts; performing an analysis operation, the analysis engine receiving the categorized corresponding concepts and mapping the categorized human experience concepts to human experience enhancement objectives to provide a mapped human experience insight; and, providing the mapped human experience insight to a results engine, the results engine using the mapped human experience insight generate a human experience recommendation.

In another embodiment the invention relates to a system comprising: a processor; a data bus coupled to the processor; and a non-transitory, computer-readable storage medium embodying computer program code, the non-transitory, computer-readable storage medium being coupled to the data bus, the computer program code interacting with a plurality of computer operations and comprising instructions executable by the processor and configured for: receiving standardized human experience concepts and categorized human experience concepts; performing an analysis operation, the analysis engine receiving the categorized corresponding concepts and mapping the categorized human experience concepts to human experience enhancement objectives to provide a mapped human experience insight; and, providing the mapped human experience insight to a results engine, the results engine using the mapped human experience insight generate a human experience recommendation.

In another embodiment the invention relates to a computer-readable storage medium embodying computer program code, the computer program code comprising computer executable instructions configured for: receiving standardized human experience concepts and categorized human experience concepts; performing an analysis operation, the analysis engine receiving the categorized corresponding concepts and mapping the categorized human experience concepts to human experience enhancement objectives to provide a mapped human experience insight; and, providing the mapped human experience insight to a results engine, the results engine using the mapped human experience insight generate a human experience recommendation.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

A system, method, and computer-readable medium are disclosed for enhancing a customer's experience with an organization during the lifecycle of their relationship. Certain aspects of the invention reflect an appreciation that the value associated with an organization, or a product or service they may provide, or both, often lies in the eye of the beholder, whether it is the organization itself or a customer of the organization. Likewise, certain aspects of the invention reflect an appreciation that building blocks of value exist for almost every product or service, and by understanding the nature and characteristics of that value provides opportunities for organizations to improve their performance in current markets or break into new ones. Certain aspects of the invention likewise reflect an appreciation that the customer's perception of such value is often affected by their human experience (HX), described in greater detail herein, with the organization.

Likewise, certain aspects of the invention reflect an appreciation that enhancing a customer's HX with an organization may lead to a more enduring, productive, and profitable relationship. However, certain aspects of the invention likewise reflect an appreciation that typical approaches to enhancing a customer's HX with an organization are manual, slow, and do not scale. Likewise, certain aspects of the invention reflect an appreciation that relevant HX data is often buried within huge volumes of data scattered between disparate sources. Furthermore, certain aspects of the invention reflect an appreciation that mining that data for important nuggets of information, and then manually entering the data into existing HX solutions, is generally labor intensive.

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 1:
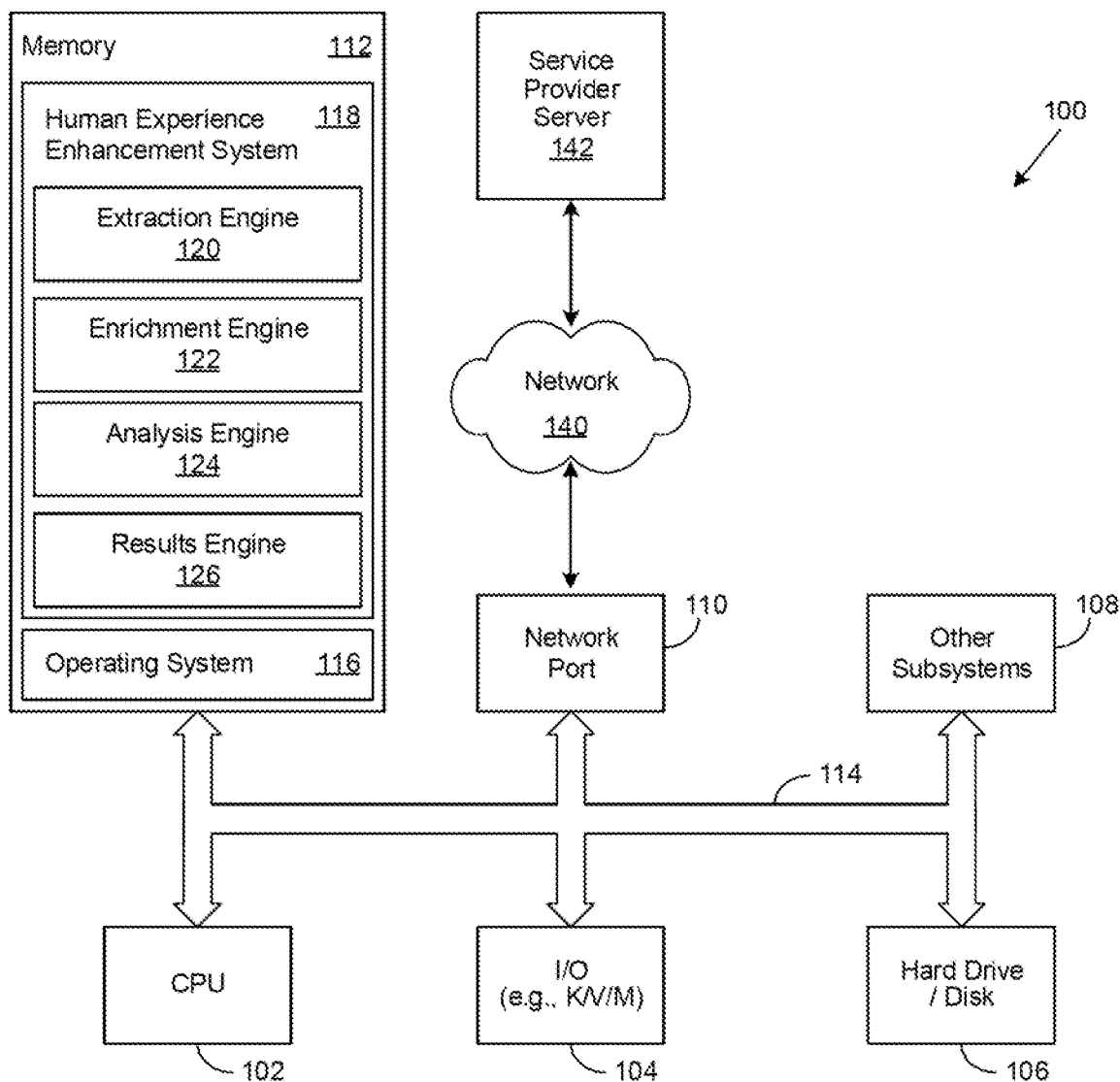
FIG. 1 shows a general illustration of components of an information handling system as implemented in the system and method of the present invention.

FIG. 1 is a generalized illustration of an information handling system 100 that can be used to implement the system and method of the present invention. The information handling system 100 includes a processor (e.g., central processor unit or "CPU") 102, input/output (I/O) devices 104, such as a display, a keyboard, a mouse, a touchpad or touchscreen, and associated controllers, a hard drive or disk storage 106, and various other subsystems 108. In various embodiments, the information handling system 100 also includes network port 110 operable to connect to a network 140, which is likewise accessible by a service provider server 142. The information handling system 100 likewise includes system memory 112, which is interconnected to the foregoing via one or more buses 114. System memory 112 further comprises operating system (OS) 116 and in various embodiments may also comprise human experience (HX) optimization system 118. In certain embodiments, the HX enhancement system 118 may be implemented to include an extraction engine 120, an enrichment engine 122, an analysis engine 124, and a results engine 126, or a combination thereof. In one embodiment, the information handling system 100 is able to download the HX enhancement system 118 from the service provider server 142. In another embodiment, the HX enhancement system 118 is provided as a service from the service provider server 142.

In certain embodiments, the HX enhancement system 118 may be implemented to perform an HX enhancement operation, described in greater detail herein. In certain embodiments, the HX enhancement operation can be executed during operation of an information handling system 100. In certain embodiments, the HX enhancement operation results in the realization of enhancing a customer's experience with an organization during the lifecycle of their relationship.

Figure 2:
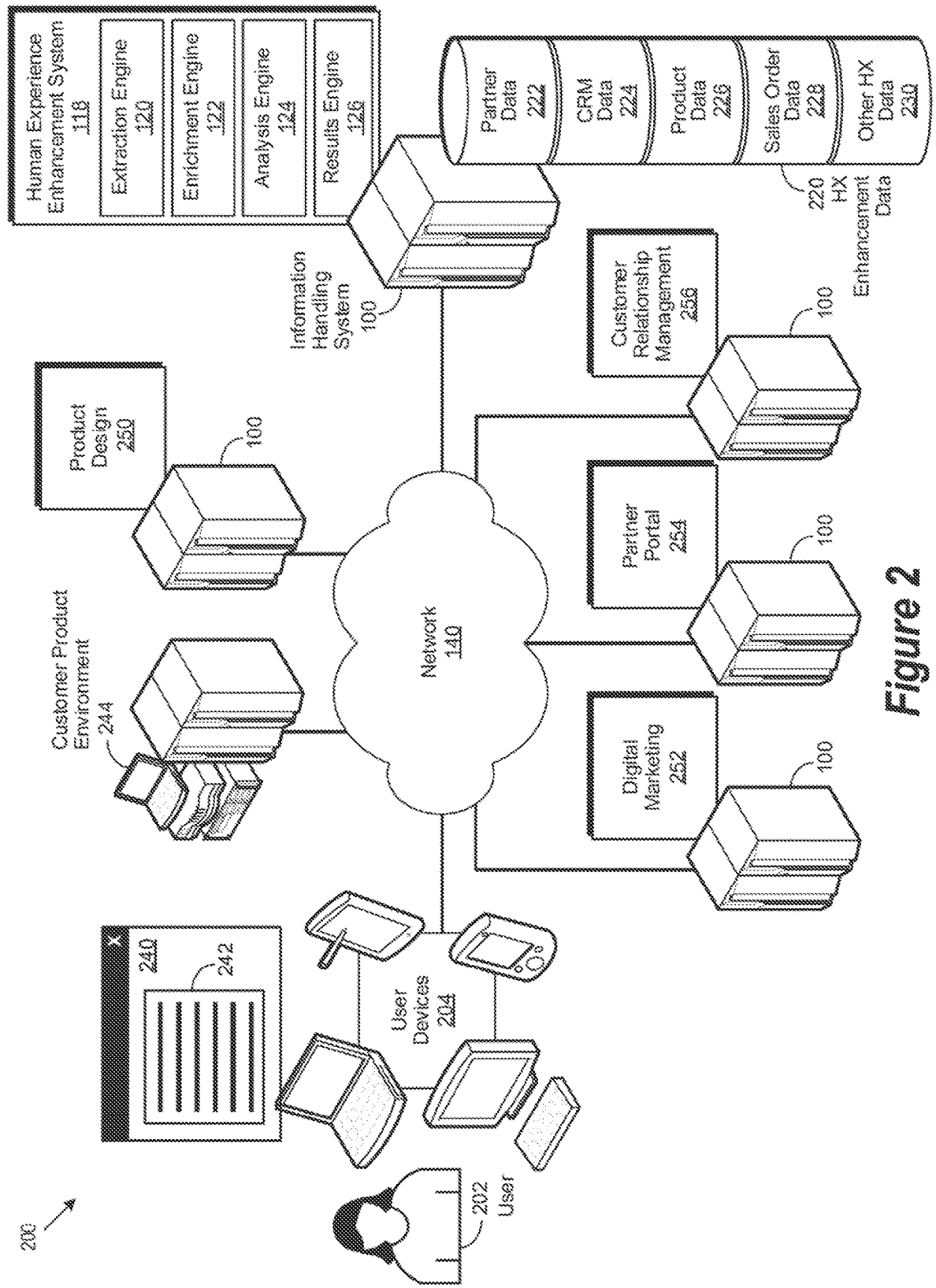
FIG. 2 is a block diagram of human experience enhancement environment.

FIG. 2 is a block diagram of human experience (HX) enhancement environment 200 implemented in accordance with an embodiment of the invention. In certain embodiments, the HX enhancement environment 200 may include an HX enhancement system 118. In certain embodiments, the HX enhancement environment 200 may include a repository of HX enhancement data 220. In certain embodiments, the repository of HX enhancement data 220 may be local to the system executing the HX enhancement system 118 or may be executed remotely. In certain embodiments, the repository of HX enhancement data 220 may include various information associated partner 222 data, customer relationship management (CRM) 224 data, product 226 data, sales order 228 data, other HX related 230 data or a combination thereof. Examples of other HX related data (not shown) include web analytics data, social media data, published analyses data, industry analyst data, HX recommendation data, described in greater detail herein, and HX results data, likewise described in greater detail herein.

In certain embodiments, the HX enhancement system 118 may be implemented to include an extraction engine 120, an enrichment engine 122, an analysis engine 124, and a results engine 126, or a combination thereof. In various embodiments, the HX enhancement system 118 may be implemented to enhance certain aspects of a customer's human experience with an organization during the lifecycle of their relationship. In certain embodiments, the extraction engine 120, an enrichment engine 122, an analysis engine 124, and a results engine, or a combination thereof may be implemented in the performance of an HX enhancement operation, described in greater detail herein. In various embodiments, the performance of such an HX enhancement operation may result in enhancing certain aspects of a customer's human experience with an organization during the lifecycle of their relationship.

In certain embodiments, a user 202 may use a user device 204 to interact with the extraction engine 120, enrichment engine 122, analysis engine 124, and results engine 126, or a combination thereof. As used herein, a user device 204 broadly refers to an information handling system such as a personal computer, a laptop computer, a tablet computer, a personal digital assistant (PDA), a smart phone, a mobile telephone, or other device that is capable of communicating and processing data. In certain embodiments, the user device 204 may be configured to present an extraction engine 120, enrichment engine 122, analysis engine 124, and results engine 126, or a combination thereof, system user interface (UI) 240. In certain embodiments, the HX enhancement system UI 240 may be implemented to present a graphical representation 242 of HX enhancement information, which is automatically generated in response to interaction with the HX enhancement system 118.

In certain embodiments, the user device 204 may be used to exchange information between the user 202 and the HX enhancement system 118, a customer product environment 244, a product design system 250, a digital marketing system 252, a partner portal 254, and a CRM system 256, or a combination thereof, through the use of a network 140. In certain embodiments, the network 140 may be a public network, such as a public internet protocol (IP) network, a physical private network, a wireless network, a virtual private network (VPN), or any combination thereof. Skilled practitioners of the art will recognize that many such embodiments are possible and the foregoing is not intended to limit the spirit, scope or intent of the invention.

In various embodiments, the HX enhancement system UI 240 may be presented via a website. In certain embodiments, the website may be provided by one or more of the HX enhancement system 118, the customer product environment 244, the product design system 250, the digital marketing system 252, the partner portal 254, and the CRM system 256, or a combination thereof. For the purposes of this disclosure a website may be defined as a collection of related web pages which are identified with a common domain name and is published on at least one web server. A website may be accessible via a public IP network or a private local network.

As used herein, a web page broadly refers to a document that is accessible via a web browser which displays the web page via a display device of an information handling system 100. In various embodiments, the web page may also include the file which causes the document to be presented via the web browser. In various embodiments, the web page may comprise a static web page, which is delivered exactly as stored and a dynamic web page, which is generated by a web application that is driven by software that enhances the web page via user input to a web server.

In certain embodiments, the HX enhancement system 118 may be implemented to interact with various aspects of the customer product environment 244, including individual products therein, such as an information handling system 100. In certain embodiments, the HX enhancement system 118 may likewise be implemented to interact with the product design system 250, the digital marketing system 252, the partner portal 254, and the CRM system 256, or a combination thereof, any of which may in turn be executing on a separate information handling system 100. In various embodiments, the product design system 250 may be implemented to interact with a customer product environment 244, including individual products therein, such as an information handling system 100. In various embodiments, the product design system 250 may be implemented to configure, or reconfigure, products or services used in the customer product environment 244. In certain embodiments, such configuration, or reconfiguration, may result in enhancing a customer's human experience with an organization during the lifecycle of their relationship.

In various embodiments, the HX enhancement system 118 may be implemented to interact with the digital marketing system 252, the partner portal 254, and the CRM system 256, or a combination thereof. In certain of these embodiments, such interaction may involve the exchange of HX enhancement data 220 stored in the repositories of partner 222, CRM 224, product 226, and sales order 228 data. In certain embodiments, the exchange of such data may result in the enhancement of a customer's human experience with an organization during the lifecycle of their relationship.

Figure 3:
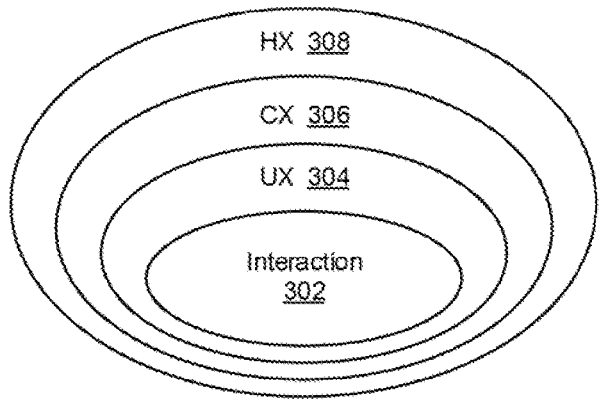
FIG. 3 shows the interrelationship between human experience (HX), customer experience (CX), and user experience (UX) with an interaction.

FIG. 3 shows the interrelationship between human experience, customer experience, and user experience with an interaction implemented in accordance with an embodiment of the invention. In certain embodiments, user experience 304 may be associated with a particular interaction 302. As used herein, an interaction 302 broadly refers to one entity's communication or involvement with another entity, such as someone or something.

For example, an organization may have an interaction 302 with a customer. As another example, a customer may have an interaction 302 with a product or service provided by the organization. As yet another example, a customer may have an interaction 302 with certain promotional materials produced by the organization. Accordingly, certain embodiments of the invention reflect an appreciation that communication associated with such interactions 302 may be verbal, nonverbal, physical, virtual, written, or visual, or a combination thereof. Certain embodiments of the invention likewise reflect an appreciation that involvement associated with such customer interactions 302 may be direct or indirect, or a combination of the two.

As likewise used herein, user experience (UX) 304 broadly refers to a person's emotions and attitudes about using a particular product, system, or service. In general usage, UX 304 typically includes the practical, experiential, affective, meaningful, and valuable aspects of product ownership. In certain embodiments, UX 304 may includes various aspects of human-machine interaction 302, such as its utility, ease of use, efficiency, and so forth. Certain embodiments of the invention reflect an appreciation that UX 304 may be subjective in nature due to its orientation to each individual's unique perceptions, attitudes, and thought processes related to such interactions 302. Various embodiments of the invention likewise reflect an appreciation that UX 304 for a particular user will likely evolve over time and may dynamically vary according to certain usage, or interaction 302, circumstances.

As used herein, customer experience (CX) 306 broadly refers to a customer's holistic perception of an organization, based upon their interactions 302 throughout the lifecycle of the customer relationship. As likewise used herein, the lifecycle of the customer relationship broadly refers to the interactions 302 between a customer and an organization from the time they may consider making a purchase to become a customer until they cease to be a customer. For example, a customer relationship lifecycle may begin when a customer begins to consider signing a sales contract, or other binding agreement, to purchase a product or service. To continue the example, the end of the customer relationship lifecycle may occur when the customer no longer uses the product or service they previously purchased.

Certain embodiments of the invention reflect an appreciation that CX 306 effectively encompasses many aspects of an organization's offerings, including customer care, advertising, packaging, product and service features, ease of use, reliability, and warranties. Certain embodiments of the invention likewise reflect an appreciation that CX 306 may also involve creating direct and indirect relationships with customers, as well as how they buy, use, and receive services, such as by online or face-to-face in-store interactions 302 with the customer. Likewise, certain embodiments of the invention reflect an appreciation that CX 306 implies a customer's involvement with an organization at different levels, such as rational, emotional, sensorial, physical, and spiritual, as described in greater detail herein.

Accordingly, certain embodiments of the invention reflect an appreciation that CX 306 is a result of virtually every interaction 302 a customer may have with an organization, no matter how seemingly insignificant. Such interactions may include navigating the organization's web site, the sales experience associated with purchasing a product or service provided by the organization, using the product or service, and receiving follow-on support after the purchase. As a result, effectively everything an organization may do has a potential impact on their customer's perception, and as a result, their decision to continue the customer relationship, or not.

As used herein, human experience (HX) 308 broadly refers to the mental, emotional, spiritual, and physical characteristics that shape who an individual is, how they perceive the world around them, what they expect from certain individuals and organizations, and why they may elect to interact 302 with them. Various embodiments of the invention reflect an appreciation that such interaction 302 may include certain aspects of CX 306, or UX 304, or a combination of the two. Accordingly, in certain embodiments, HX 308 may include CX 306, and by extension, UX 304 as well.

Figure 4:
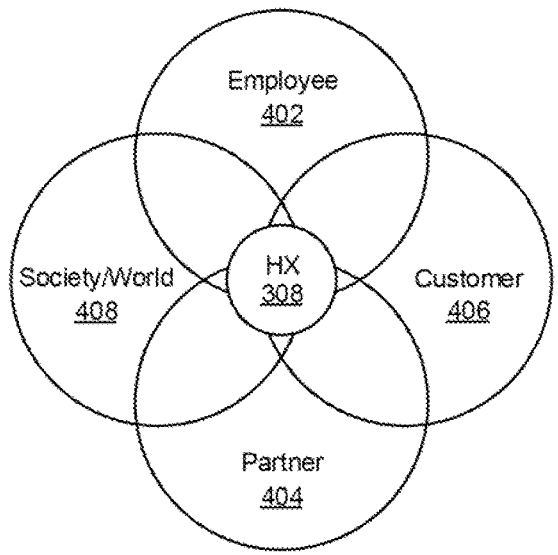
FIG. 4 is a Venn diagram showing the relationship of HX to interrelated entities.

FIG. 4 is a Venn diagram showing the relationship of human experience to interrelated entities, as implemented in accordance with an embodiment of the invention. In various embodiments, certain entities, such as a customer 406 of an organization, an employee 402 of the organization, a partner 404 of the organization, and society in general and the world at large 408, or a combination thereof, may be interrelated as shown in FIG. 4. In certain embodiments, human experience (HX) 308, described in greater detail herein, may reside at the intersection of these entities. Skilled practitioners of the art will realize that many such entities, and interrelationships, are possible. Accordingly, the foregoing is not intended to limit the spirit, scope, or intent of the invention.

Figure 5:
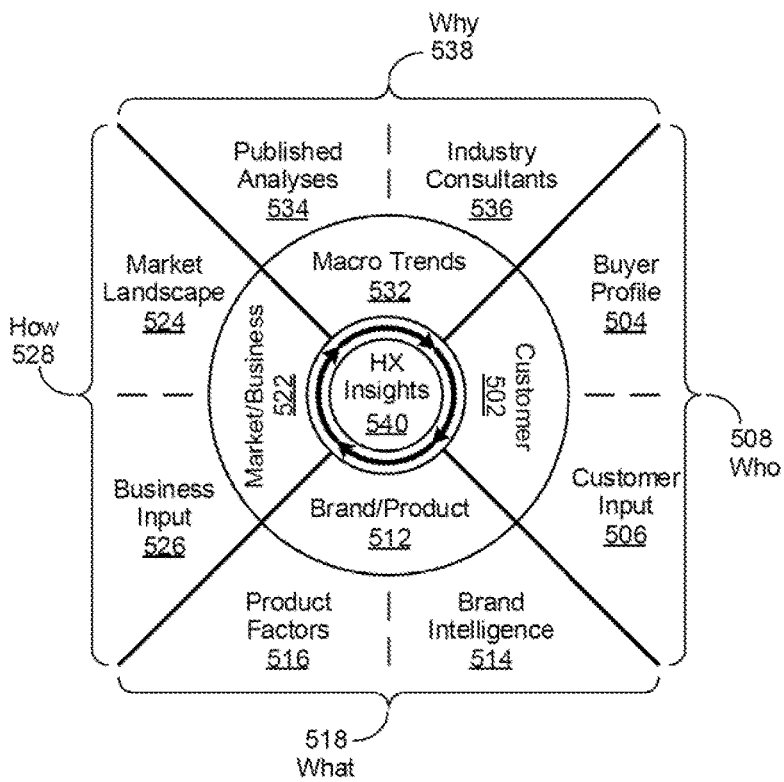
FIG. 5 shows a graphical depiction of HX aspects and factors used to generate a human experience insight.

FIG. 5 shows a graphical depiction of human experience aspects and factors used in accordance with an embodiment of the invention to generate a human experience insight. As used herein, a human experience (HX) insight 540 broadly refers to information associated with how to enhance, or otherwise improve, a customer's relationship with an organization during the lifecycle of their customer relationship lifecycle. In various embodiments, such information may include certain HX aspects. In certain embodiments, HX aspects associated with generating an HX insight 540 for a particular customer may include consideration of who 508 the customer may be, what 518 matters to them, how 528 the organization's product or service may be used, and why 538 its use matters. As used herein, enhancing the customer's human experience broadly refers to improving, or otherwise enhancing, to the greatest extent possible, the customer's perception of the organization throughout the lifecycle of the customer relationship.

In various embodiments, a customer metric and an experience metric may be generated as a result of performing an analysis operation associated with certain HX aspects and HX factors shown in FIG. 5. In certain embodiments, information associated with the HX aspects of who 508 the customer may be, and why 538 the use of an organization's product or service matters to them, may be used to generate the customer metric. In certain embodiments, information associated with the HX aspects of what 518 matters to the customer, and how 528 the customer may use an organization's product or service, may be used to generate the experience metric. In certain embodiments, a weighting factor may be respectively assigned to the customer metric (e.g., 60%) and the experience metric (e.g., 30%). In these embodiments, the weighting factor respectively assigned to the customer metric or the experience metric is a matter of design choice.

As an example, a customer may experience anticipation once they have decided to purchase a new computer system based upon its advertised specifications and price. However, the system may not perform as well as the customer expected once it is implemented. As a result, the customer's experience associated with the purchase of the system may be disappointment. However, the customer may place a support call and receive patient and effective assistance in configuring the system such that it exceeds the customer's original expectations. In this example, the customer's experience may have ranged from anticipation once the system was purchased, to disappointment when initially implemented, to satisfaction once they received assistance in configuring it. Accordingly, certain embodiments of the invention reflect an appreciation that a particular customer's experience can be improved, and possibly enhanced over time, by gaining insight into various HX aspects and factors associated with the customer.

In certain embodiments, each HX aspect shown in FIG. 5 may be associated with one or more HX factors. For example, in various embodiments, the who 502 HX aspect may be related to HX factors associated with the customer 502, such as their buyer profile 504 and certain customer input 506 they may provide to an organization. In certain embodiments, a buyer profile 504 may be implemented to include information related to the customer's 502 their size, geographic location, business model, purchasing habits, and so forth. In certain embodiments, customer input 506 may include information related to the customer's 502 customer journey. As used herein, customer journey broadly refers to the end-to-end activities that a customer undertakes when deciding to make a purchase from a particular organization.

In various embodiments, the what 518 HX aspect may be associated with HX factors related to the organization's brand, products, and services 512, such as brand intelligence 514 and certain product factors 516. In certain embodiments, brand intelligence 514 may include information related to an organization's recognition in the marketplace, their marketing approach, advertising channels, packaging, trust familiarity, and so forth. In certain embodiments, product factors 516 may include product specifications, build quality, product and services reliability statistics, service level response times, warranties, and so forth.

In various embodiments, the how 528 HX aspect may be associated with HX factors related to the customer's market and business 522, such as market landscape 524 and certain business input 526. In certain embodiments, market landscape 524 may include information related to the customer's industry sector, their target market sectors, market penetration, their competitive landscape, revenue goals, and so forth. In certain embodiments, business input 526 may include information related to the customer's organization structures, business models, external and internal operational processes, and so forth.

In various embodiments, the why 308 HX aspect may be associated with HX factors related to certain macro trends 532, such as information provided by published analyses 534 and industry analysts 536. In certain embodiments, published analyses 534 may include information related to societal and industry trends, emerging markets, and so forth. In various embodiments, information provided by industry consultants 536 may include certain macro trend information that is pertinent to the organization's products, services, market goals, and so forth.

Accordingly, certain embodiments of the invention reflect an appreciation that reaching a better understanding of such HX factors may facilitate the generation of useful HX enhancement insights 540. As used herein, an HX enhancement insight 540 broadly refers to an accurate and deep understanding of how to enhance, or otherwise improve, the customer's perception of the organization from an HX perspective. For example, an HX enhancement insight 540 may include an understanding that while a customer may have bought a particular product from the organization in the past due to its reliability and price point, they do not plan to do so in the future as they no longer find the product's design appealing due to certain design trends exhibited in competitive products. To continue the example, realization of such a HX enhancement insight 540 may result in the organization revising the product's design while retaining its established reliability and price point to improve the customer's experience and increase the probability of future sales.

As another example, a computer manufacturer may have had a design goal of producing a laptop computer with a thin screen bezel. As a result, the laptop's forward-facing camera lens was placed in the bottom edge of the screen bezel, where there was more room than the top and side edges. However, the placement of the camera has led to customer dissatisfaction due to the camera showing an off-axis view of the user's face. As a result of customer input 506 to that effect, and incorporating certain product factors 516, the manufacturer may decide to relocate the camera to the top bezel, which may result in providing an on-axis view of the user's face, albeit with the trade-off of a thicker screen bezel. Those of skill in the art will recognize that many such HX factors may be used to generate an HX enhancement insight 540. Accordingly, the foregoing is not intended to limit the spirit, scope, or intent of the invention.

Figure 6:
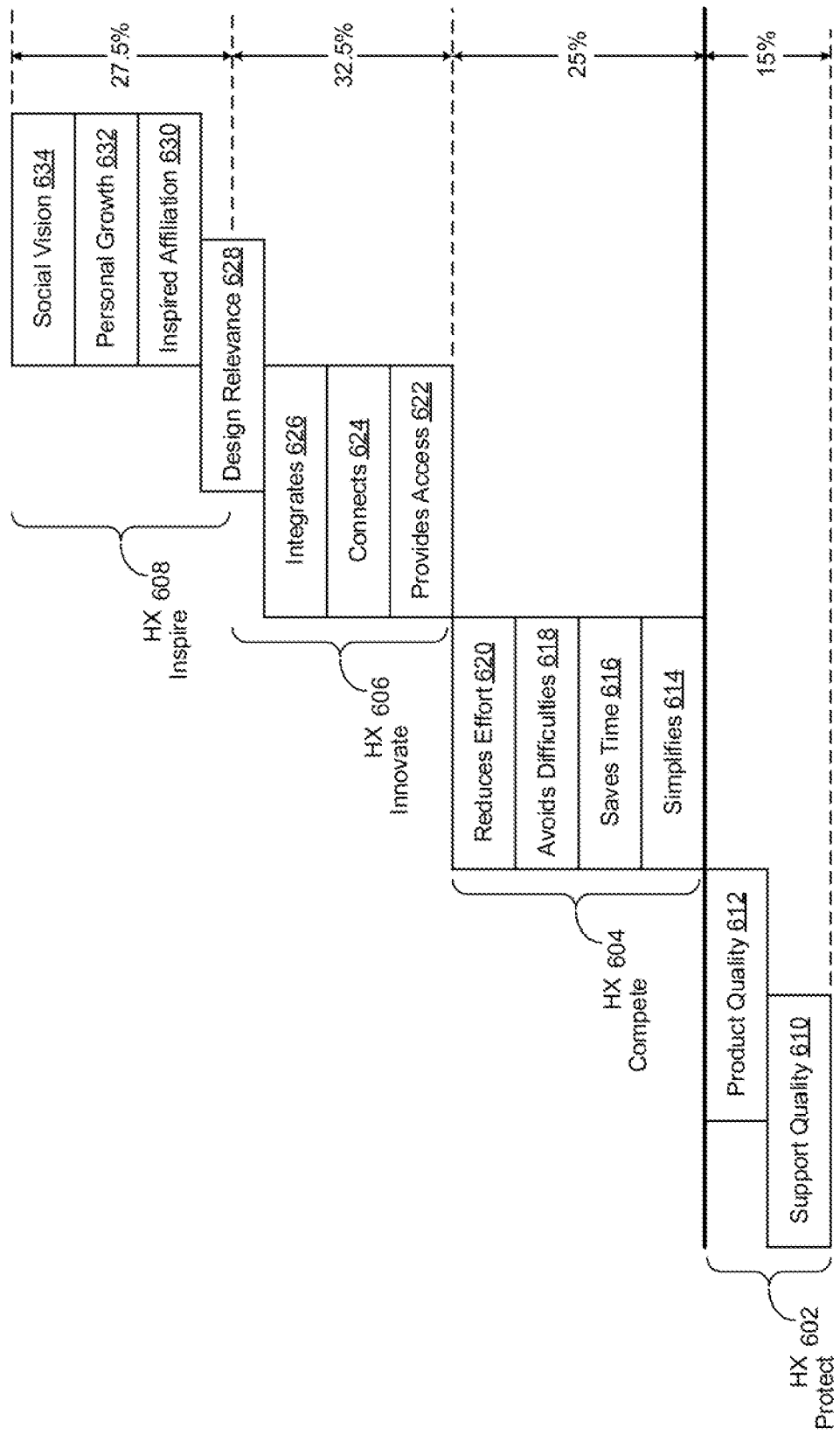
FIG. 6 shows a block diagram of example HX objectives and associated HX elements.

FIG. 6 shows a block diagram of human experience (HX) objectives and associated HX elements implemented in accordance with an embodiment of the invention. As used herein, an HX objective broadly refers to a qualitative goal that may be achieved through the devotion of certain of HX-related efforts and resources, described in greater detail herein. As likewise used herein, an HX element broadly refers to particular aspect of an associated HX objective. In various embodiments, as shown in FIG. 6, an organization may decide to proportionately devote their HX efforts and resources to achieve certain HX objectives, such as protect 602 (e.g., 15%), compete 604 (e.g., 25%), innovate 606 (e.g., 32.5%), and inspire 608 (e.g., 27.5%).

In certain embodiments, an organization may decide to achieve an HX objective of protecting 602 their current customer base by devoting 15% of their CX efforts and resources toward HX elements that maintain, or improve product support 610 and product 612 quality. Likewise, in certain embodiments, an organization may decide to achieve an HX objective of maintaining their competitive 604 position by devoting 25% of their HX efforts and resources toward HX elements that simplify 614, saves time 616, avoids difficulties 618, and reduces effort 620. In certain embodiments, an organization may likewise decide to achieve an HX objective of establishing themselves as being an innovator 606 by devoting 32.5% of their HX efforts and resources toward HX elements that provide access 622, connects 624, integrates 626, and exhibits design relevance 628.

Likewise, in certain embodiments, an organization may decide to achieve an HX objective of providing inspiration 608 by devoting 27.5% of their HX efforts and resources toward HX elements that exhibit design relevance 628, encourages inspired affiliation 630, promotes personal growth 632, and demonstrates social vision 634. In these embodiments, the proportion of an organization's HX efforts and resources dedicated to individual HX objectives and HX elements is a design choice. Skilled practitioners of the art will recognize that many such examples of HX objectives and HX elements, and their respective proportional use HX efforts and resources, are possible. Accordingly, the foregoing is not intended to limit the spirit, scope, or intent of the invention.

Figure 7:
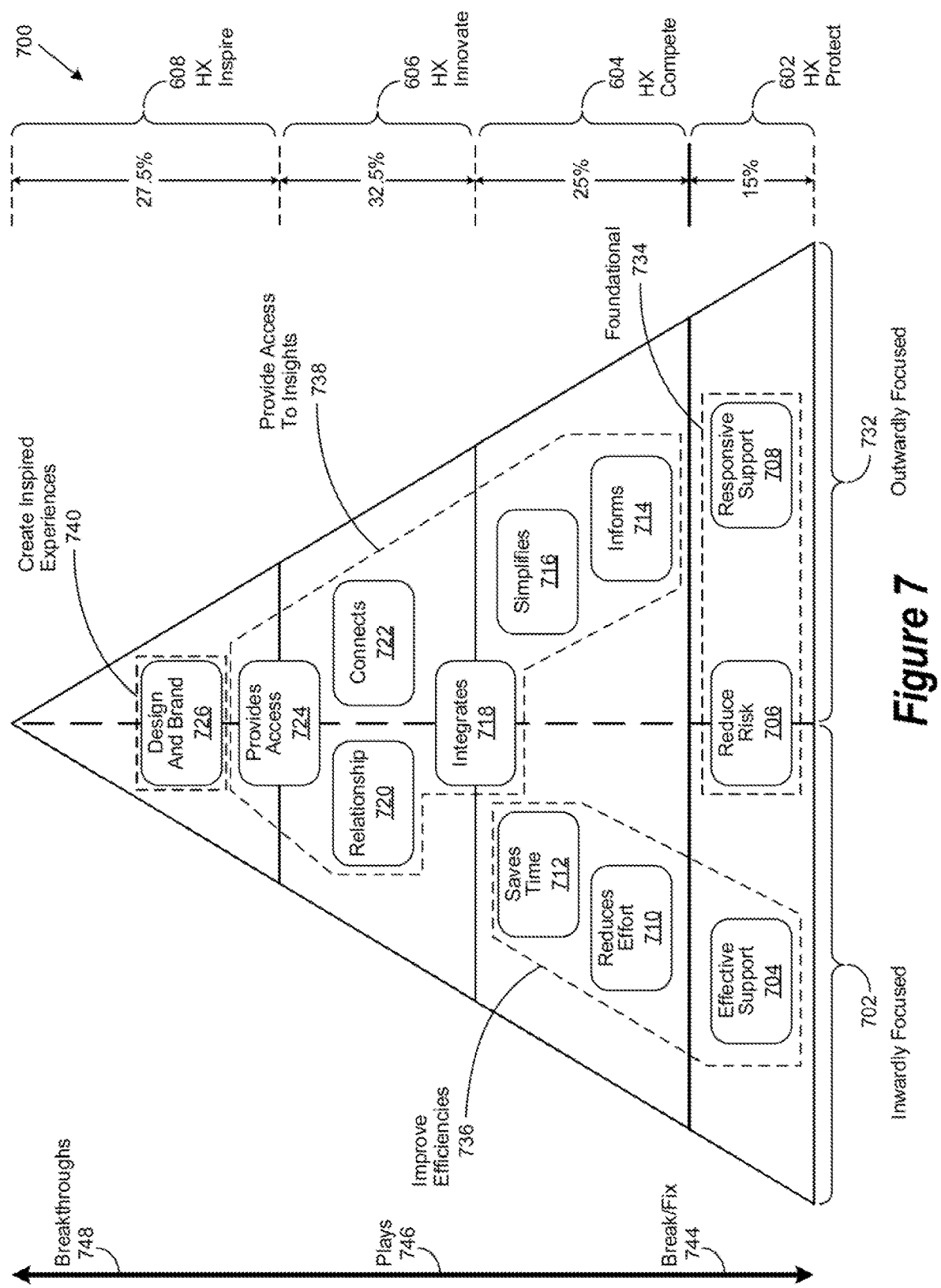
FIG. 7 shows a ranked hierarchy of standardized HX concepts associated with corresponding HX objectives.

FIG. 7 shows a ranked hierarchy of standardized human experience (HX) concepts associated with corresponding HX objectives implemented in accordance with an embodiment of the invention. In certain embodiments, an enrichment engine may be implemented during an enrichment phase, as described in greater detail herein, to generate a ranked hierarchy of standardized HX concepts. In various embodiments, certain standardized HX concepts in the ranked hierarchy of standardized HX concepts 700 may be associated with one or more HX objectives, described in greater detail herein. As an example, as shown in FIG. 7, the standardized HX concepts of effective support 704, reduce risk 706, and responsive support 708 may be associated with the HX objective of protect 602. Likewise, the standardized HX concepts of reduces effort 710, saves time 712, informs 714, and simplifies 716 may be associated with the HX objective of compete 604.

As likewise shown in FIG. 7, the standardized HX concepts of relationship 720 and connects 722 may be associated with the HX objective of innovate 606. Likewise, the standardized HX concept of design and brand 726 may be associated with the HX objective of inspire 608. Furthermore, the standardized HX concept of integrates 718 may be associated with the HX objectives of compete 604 and innovate 606. Likewise, the standardized HX concept of provides access 724 may be associated with the HX objectives of innovate 606 and inspire 608.

In various embodiments, enrichment operations may be performed to categorize certain standardized HX concepts into corresponding classes of standardized HX concepts. In certain embodiments, as described in greater detail herein, the enrichment operations may be performed by an enrichment engine during an enrichment phase. For example, as shown in FIG. 7, the standardized HX concepts of reduce risk 706, and responsive support 708 may be categorized as a foundational 734 class of standardized HX concepts.

Likewise, the standardized HX concepts of effective support 704, reduces effort 710, and saves time 712 may be categorized as an improve efficiencies 736 class of standardized HX concepts. As likewise shown in FIG. 7, the standardized HX concepts of informs 714, simplifies 716, integrates 718, relationship 720, connects 722, and provides access 724 may be categorized as a provides access to insights 738 class of standardized HX concepts. Likewise, the standardized HX concept of design and brand 726 may be categorized as a create inspired experiences 740 class of standardized HX concepts.

In various embodiments, as described in greater detail herein, certain analysis operations may be performed, as described in greater detail herein, to map the classes of standardized HX concepts corresponding to one or more HX objectives to generate a mapped HX insight. In various embodiments, certain machine learning approaches familiar to skilled practitioners of the art may be used to generate the mapped HX insights. In certain embodiments, the analysis operations may be performed by an analysis engine during an analysis phase, as described in greater detail herein. For example, as shown in FIG. 7, the foundational 734 class of standardized HX concepts may be mapped to the HX objective of protect 602. To continue the example, the mapping of the foundational 734 class of standardized HX concepts to the HX objective of protect 602 may result in the generation of a mapped HX insight that a customer perceives the foundational 734 class of standardized HX concepts assists in protecting 602 the existing relationship between the customer and the organization.

As another example, the improve efficiencies 736 class of standardized HX concepts may be mapped to the HX objectives of protect 602 and compete 604. To continue the example, the mapping of the improve efficiencies 736 class of standardized HX concepts to the HX objectives of protect 602 and compete 604 may result in the generation of a mapped HX insight that a customer perceives the improve efficiencies 736 class of standardized HX concepts not only assists in protecting 602 the existing relationship between the customer and the organization, but allows both to compete 604 more effectively. As yet another example, the provide access to insights 738 class of standardized HX concepts may be mapped to the HX objectives of compete 604, innovate 606, and inspire 608. To continue the example, the mapping of the provide access to insights 738 class of standardized HX concepts to the HX objectives of protect compete 604, innovate 606, and inspire 608 may result in the generation of a mapped HX insight that both an organization and their customer may perceive the access to insights 738 class of standardized HX concepts allows them to compete 608 more effectively while being more innovative 606 and inspirational 608.

As yet still another example, the create inspired experiences 740 class of standardized HX concepts may be mapped to the HX objective of inspire 608. To continue the example, the mapping of the create inspired experiences 740 class of standardized HX concepts to the HX objective of inspire 608 may result in the generation of a mapped HX insight that a customer may perceive the creation of inspired experiences 740 class of standardized HX concepts enhancing the relationship they may have with an organization. Skilled practitioners of the art will recognize that many such examples of standardized HX concepts, classes of standardized HX concepts, and mappings to associated HX objectives are possible, and by extension the mapped HX insights that may be generated therefrom. Accordingly, the foregoing is not intended to limit the spirit, scope, or intent of the invention.

In certain embodiments, the HX perspective of a particular standardized HX concept, or class of standardized HX concepts, may be inwardly 702 focused, outwardly 732 focused, or both. As used herein, HX perspective broadly refers to who is affected by a particular standardized HX concept. For example, the affect of a particular standardized HX concept such as effective support 704 may be more oriented to an organization that provides support for a product or service. Accordingly, effective support 704 may be considered inwardly 702 focused due to the organization's goal of meeting internal support effective metrics to insure the customer receives the product or service support they need.

Conversely, the effect of a standardized HX concept such as responsive support 708 may be more oriented to a customer who values responsiveness to their support needs. Accordingly, responsive support 708 may be considered outwardly 732 focused due to the customer's perception of how responsive the organization may be when providing support. Likewise, the affect of a standardized HX concept such as reduce risk 706 may be oriented, to one degree or another, to both an organization and a customer. Accordingly, reduce risk 706 may be considered both inwardly 702 and outwardly 732 focused as its affect is oriented to both an organization and a customer.

In various embodiments, certain standardized HX concepts, or classes of standardized HX concepts, or a combination of thereof, may be associated with a corresponding HX value. As used herein, HX value broadly refers to the value associated with a particular mapped HX insight generated by mapping classes of standardized HX concepts to one or more HX objectives. For example, as shown in FIG. 7, mapped HX insights generated by mapping the foundational 734 class of standardized HX concepts to the protect 602 HX objective may be considered to be low value, as they may be primarily oriented to break/fix 744 situations involved in the relationship between an organization and their customer. Likewise, mapped HX insights generated by mapping the improve efficiencies 736 class of standardized HX concepts to the protect 602 and compete 604 HX objectives may range from low value break/fix 744 mapped HX insights to moderate value mapped HX insight plays 746.

As likewise shown in FIG. 7, mapped HX insights generated by mapping the provide access to insights 736 class of standardized HX concepts to the compete 604, innovate 606, and inspire 608 HX objectives may range from moderate value mapped HX insight plays 746 to high value mapped HX insight breakthroughs 748. Likewise, mapped HX insights generated by mapping the create inspired experiences 740 class of standardized HX concepts to the inspire 608 HX objective may result in high value mapped HX insight breakthroughs 748. Those of skill in the art will recognize that many such examples of HX value are possible. Accordingly, the foregoing is not intended to limit the spirit, scope, or intent of the invention.

Figure 8:
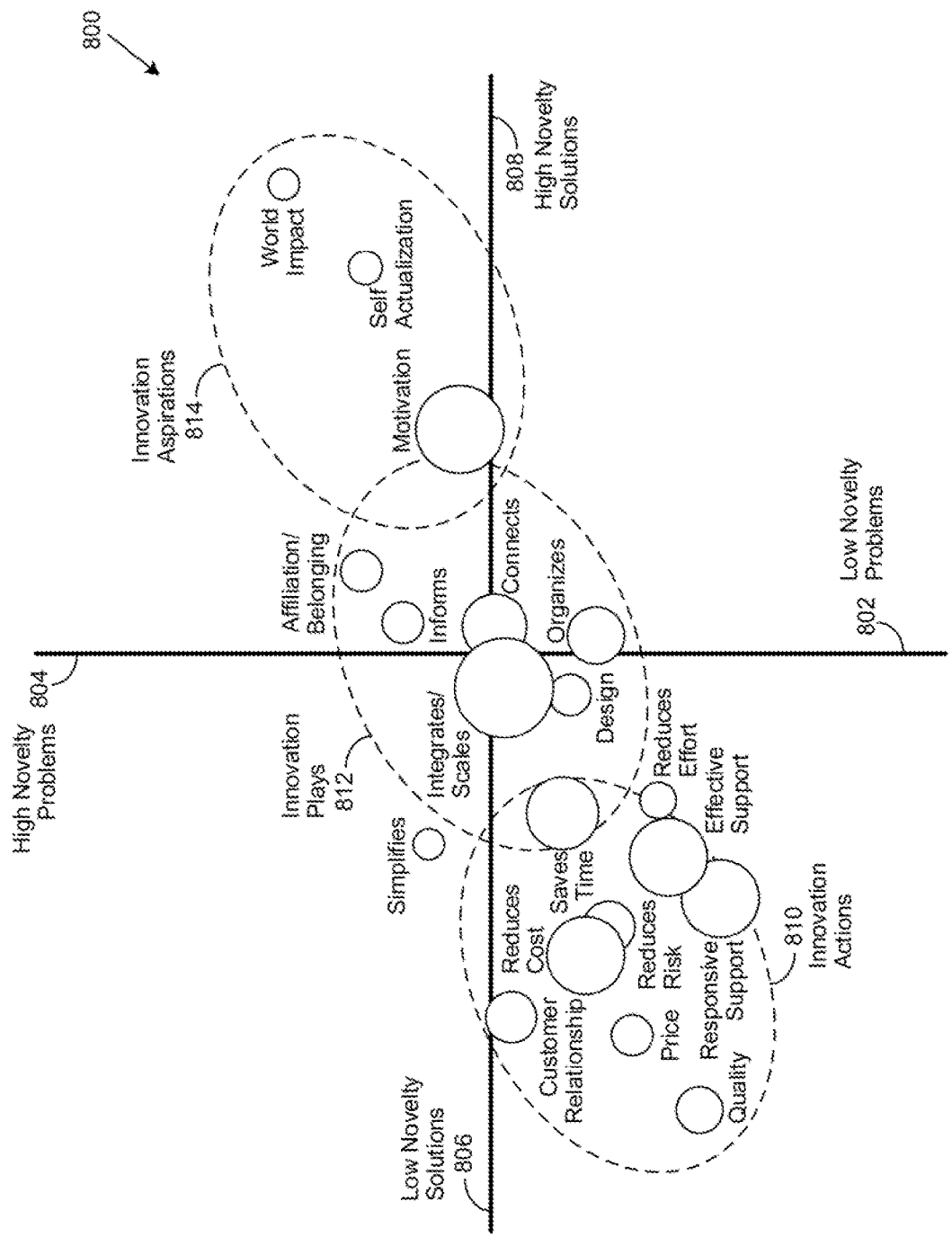
FIG. 8 shows a weighted Cartesian scatter plot of mapped HX insights.

FIG. 8 shows a weighted Cartesian scatter plot of mapped human experience (HX) insights implemented in accordance with an embodiment of the invention. In various embodiments, as described in greater detail herein, certain mapped HX insights may be generated by mapping standardized HX concepts, or classes of standardized HX concepts, or a combination of the two, to associated HX objectives. In certain embodiments, as shown in FIG. 8, such mapped HX insights may be plotted on a weighted Cartesian scatter plot 800 of mapped HX insights. In certain embodiments, the relative importance, or the frequency of their generation, or the anticipated value of their associated affect, or a combination thereof, of each mapped HX insight is indicated by their respective location on the plot and the proportional size of their depiction.

For example, as shown in FIG. 8, mapped HX insights may be plotted on weighted Cartesian scatter plot 800 where the x axis is defined by low novelty solutions 806 and high novelty solutions 808, and the y axis is defined by low novelty problems 802 and high novelty problems 804. Accordingly, the plotting of an individual mapped HX insight on the Cartesian scatter plot 800 may indicate the respective novelty of a problem referenced by the mapped HX insight and the novelty of its associated solution. In certain embodiments, the associated solution may be in the form of an HX enhancement recommendation or result, both of which are described in greater detail herein.

Likewise, in certain embodiments, the relative size of one mapped HX insight's depiction relative to another may reflect their respective importance, frequency of generation, or anticipated value of their associated affect, or a combination thereof. As an example, the position of the "price" mapped HX insight on the Cartesian scatter plot 800 indicates it is a lower novelty problem 802 and represents a lower novelty solution 806, whereas the position of the "motivation" mapped HX insight indicates it is a somewhat higher novelty problem 804 and represents a higher novelty solution 808. Likewise, the larger depiction of the "motivation" mapped HX insight, relative to the smaller depiction of the "price" mapped HX insight, indicates it has importance, frequency of generation, or anticipated value of their associated affect, or a combination thereof. In certain embodiments, individual mapped HX insights may be plotted, and grouped, on the Cartesian scatter plot 800 according to whether they are considered to represent innovation actions 810, innovation plays 812, or innovation aspirations 814.

Figure 9:
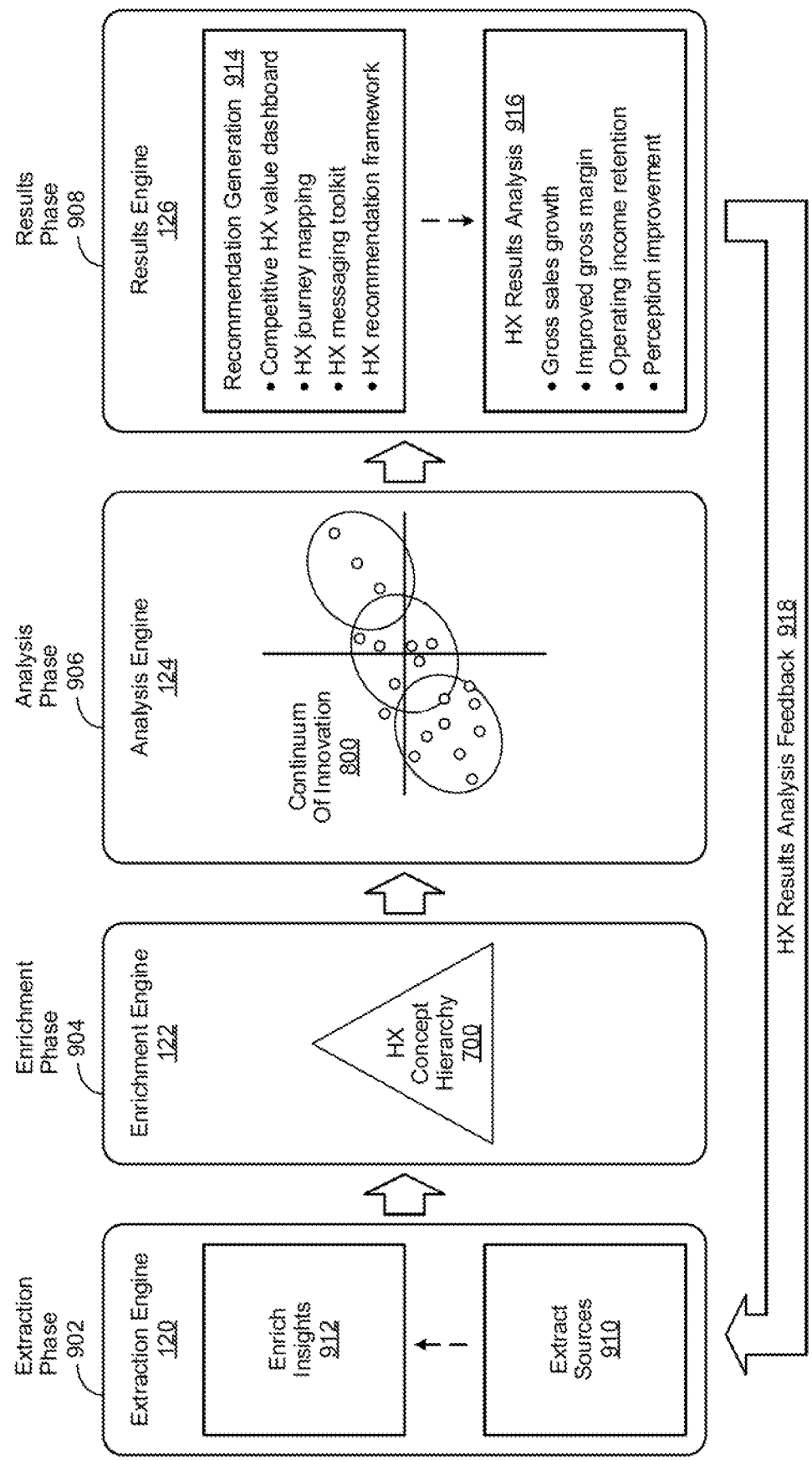
FIG. 9 shows a simplified process flow of HX operations.

FIG. 9 shows a simplified process flow of human experience (HX) operations implemented in accordance with an embodiment of the invention. In various embodiments, an extraction engine 120 may be implemented during an extraction 902 phase, as described in greater detail herein, to extract certain HX related information from one or more HX related data extract sources 910. In certain embodiments, the data extract sources may include data stored in one or more repositories of HX enhancement data, shown in FIGS. 2, 11, and 12.

In certain embodiments, the extraction engine 120 may likewise be implemented during the extraction 902 phase, as described in greater detail herein, to perform certain insight enrichment 912 operations. In certain embodiments, the insight enrichment 912 operations may include processing the extracted HX related data to generate standardized HX concepts, as described in greater detail herein. In various embodiments, certain natural language processing (NLP) approaches familiar to skilled practitioners of the art may be used to generate the standardized HX concepts.

In various embodiments, an enrichment engine 122 may be implemented during an enrichment phase 904, as described in greater detail herein, to generate a ranked hierarchy of standardized human experience (HX) concepts. In various embodiments, the enrichment 122 engine may be implemented to associate certain HX insights with a corresponding HX objective, as likewise described in greater detail herein. In various embodiments, as likewise described in greater detail herein, the enrichment 122 engine may be implemented to categorize certain standardized HX concepts into classes of standardized HX concepts. As likewise described in greater detail herein, the enrichment engine may be implemented in various embodiments to generate an HX insight by mapping classes of standardized HX insights to one or more HX objectives.

In various embodiments, an analysis engine 124 may be implemented during an analysis 906 phase to plot certain HX insights onto a weighted Cartesian scatter plot of standardized HX insights. In certain embodiments, the analysis engine 124 may likewise be implemented to indicate the relative importance, frequency of their generation, anticipated value of their associated affect, or a combination thereof, of each HX insight by their respective location on the plot and the proportional size of their depiction.

In certain embodiments, a results engine 126 may be implemented during a results 908 phase to generate an HX recommendation 914, described in greater detail herein, from the HX insights generated by the enrichment engine 122 during the enrichment 904 phase. In certain embodiments, the results engine 126 may likewise be implemented during the results 908 phase to analyze 916 the results of implementing a particular HX recommendation. In certain embodiments, data associated with the HX results analysis 916 may be provided as HX results analysis feedback 918.

In certain embodiments, the HX results analysis feedback 918 may be used to iterate one or more of the extraction operation, the enrichment operation, and the analysis operation. In certain embodiments, the extraction operation, the enrichment operation, and the analysis operation may be iterated to generate a refined human experience recommendation. In certain embodiments, the HX results analysis feedback 918 may be used as an additional input when generating the refined human experience. In certain embodiments, the HX results analysis feedback 918 may provide an additional weighting factor (e.g., 10%) that may be used with more or both of the weighting factor associated a particular customer metric (e.g., 60%), or experience metric (e.g., 30%), described in the descriptive text associated with FIG. 5. In certain embodiments, the data associated with the HX results analysis 916 may be stored in a repository of HX results analyses data, as described in more detail in the descriptive text associated with FIG. 12. In certain embodiments, the process is iteratively repeated.

Figure 10:
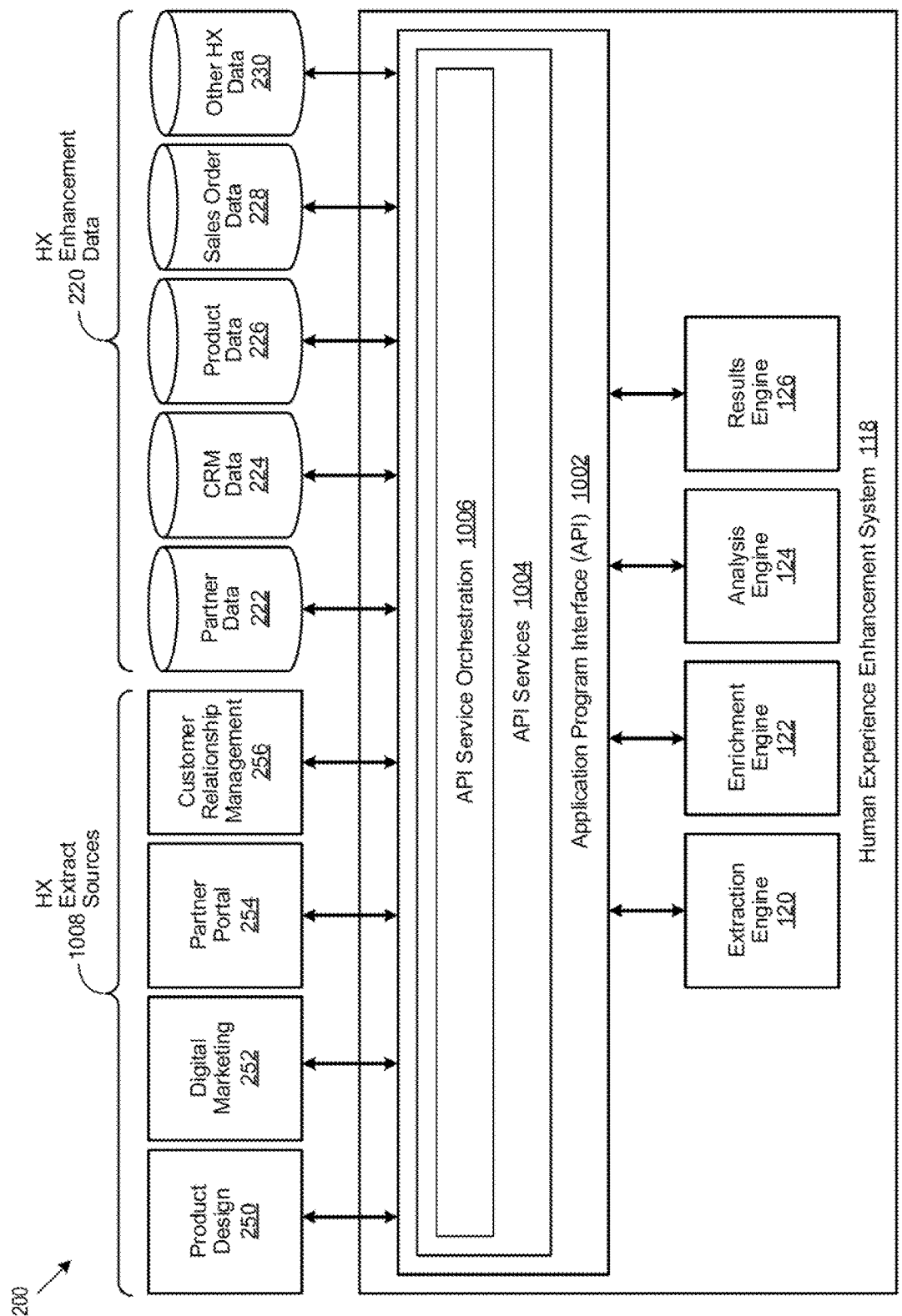
FIG. 10 shows the orchestration of elements associated with an HX enhancement environment.

FIG. 10 shows the orchestration of elements associated with a human experience (HX) enhancement environment implemented in accordance with an embodiment of the invention. In certain embodiments, an HX enhancement system 118, described in greater detail herein, may be implemented with an Application Program Interface (API) 1002, familiar to skilled practitioners of the art. In certain embodiments, the API 1002 of the HX enhancement system 118 may be implemented to enable various API services 1004, which are in turn orchestrated, as likewise described in greater detail herein, by an API service orchestration 1006 service.

In certain embodiments, the API 1002 may be implemented to provide an interface to an extraction engine 120, an enrichment engine 122, an analysis engine 124, and a results engine 126, or a combination thereof, all of which are described in greater detail herein. In certain embodiments, the API 1002 may be implemented to provide an interface between the HX enhancement system 118 and HX extract sources 908. Examples of such HX extract sources 908 include product design 250, digital marketing 252, partner portal 254, and customer relationship management (CRM) 256 systems. In certain embodiments, HX enhancement data provided by the HX extract sources 908 may be stored in one or more repositories of HX enhancement data 220. In certain embodiments, the API 1002 may be implemented to provide an interface to various repositories of HX enhancement data 220, likewise described in greater detail herein. Examples of such HX enhancement data 220 include partner 222, CRM 224, 226 and sales order 228 data.

In certain embodiments, various functionalities provided by the extraction engine 120, the enrichment engine 122, the analysis engine 124, and the results engine 126 may in turn be provided as an API service 1004 to the HX enhancement system 118. In certain embodiments, various functionalities of the product design 250, digital marketing 252, partner portal 254, and customer relationship management (CRM) 256 systems may be provided to the HX enhancement system 118 as one or more API services 1004. In certain embodiments, access to data contained in the various repositories of HX enhancement data 220 may likewise be provided as one or more API services 1004. Those of skill in the art will recognize that many such embodiments are possible. Accordingly, the foregoing is not intended to limit the spirit, scope, or intent of the invention.

Figure 11:
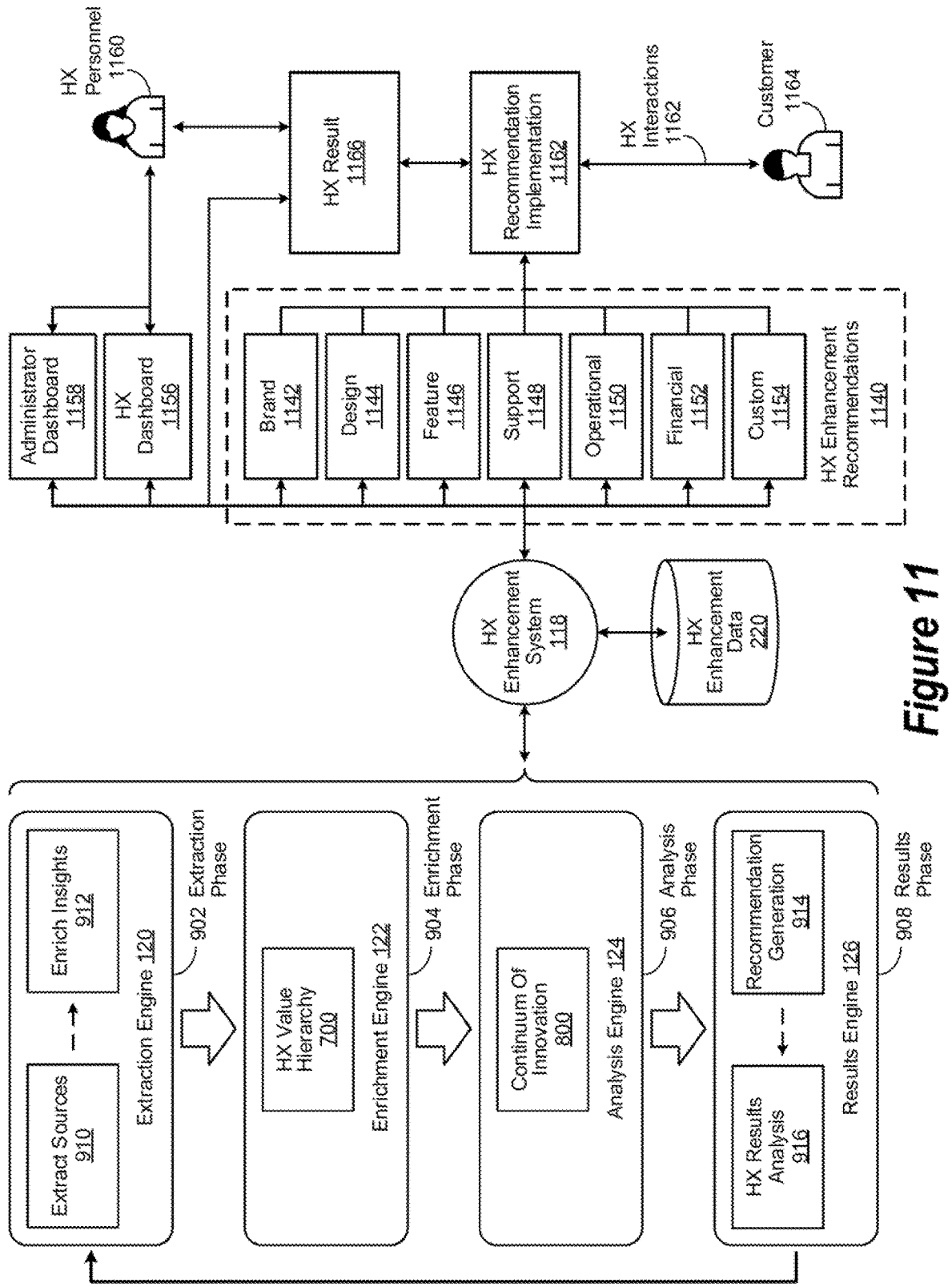
FIG. 11 shows a simplified process flow of operations to generate an HX enhancement recommendation.

FIG. 11 shows a simplified process flow of operations performed in accordance with an embodiment of the invention to generate a human experience (HX) recommendation implemented in accordance with an embodiment of the invention. As used herein, an HX recommendation 1140 broadly refers to a proposed course of action whose implementation 1162 may result in an enhanced HX experience, described in greater detail herein, a customer may attain during the lifecycle of their relationship with an organization. In certain embodiments, implementation 1162 of a particular HX recommendation 1140 may culminate in an associated HX result 1166. As used herein, an HX result 1166 broadly refers to the outcome of the implementation 1162 of an associated HX enhancement recommendation 1140. In certain embodiments, a particular HX result 1166 may have the effect of enhancing a customer's HX with an organization.

In certain embodiments, as described in greater detail herein, various HX enhancement operations may be performed to enhance a customer's HX with an organization during the lifecycle of their relationship. In certain embodiments, as likewise described in greater detail herein, an HX enhancement system 118 may be implemented to use information provided by an extraction engine 120, an enrichment engine 122, an analysis engine 124, and a results engine 126, or a combination thereof, to perform the HX enhancement operation. In various embodiments, as described in the descriptive text associated with FIG. 10, the extraction engine 120, enrichment engine 122, analysis engine 124, and results engine 126, or a combination thereof, may be implemented to exchange certain HX information via an Application Program Interface (API) orchestration module. In various embodiments, the HX information may be exchanged as a result of certain operations performed during an extraction 902 phase, an enrichment 904 phase, an analysis 906 phase, and a results 908 phase, or a combination thereof, likewise as described in greater detail herein.

In certain embodiments, the HX enhancement system 118 may be implemented, as described in greater detail herein, to process information respectively provided by the extraction engine 120, the enrichment engine 122, the analysis engine 124, and the results engine 126, or a combination thereof, to generate one or more HX enhancement recommendations 1140. In certain embodiments, the resulting HX enhancement recommendation 1140 may be implemented 1162 to achieve certain HX enhancement objectives, as likewise described in greater detail herein. In certain embodiments, the HX enhancement recommendations 1140 may include brand 1142, product design 1144, product feature 1146, product support 1148, operational 1150, financial 1152, and custom 1154 recommendations, or a combination thereof.

In certain embodiments, an HX enhancement 1056 dashboard and an administrator 1158 dashboard may be respectively implemented to manage and administer the generation of various HX enhancement recommendations 1140. In various embodiments, the HX enhancement 1056 dashboard, or the administrator 1158 dashboard, or both, may be used by HX personnel 1160 to manage and administer certain HX results 1166. In various embodiments, the HX enhancement 1056 dashboard, or the administrator 1158, or a combination of the two, may be used by HX personnel 1160 to provide certain data associated with one or more HX results 1166 to the HX enhancement system 118. In various embodiments, certain data associated with one or more HX results 1166 may be provided directly to the HX enhancement system 118. In various embodiments, certain data associated with one or more HX results 1166 may be stored in a repository of HX enhancement data, described in greater detail herein.

As used herein, an organization's brand broadly refers to its name, an associated design or symbol, such as a logo, or any other feature that uniquely identifies its products or service as distinct from those of another organization. Certain embodiments of the invention reflect an appreciation that brands are commonly used by an organization not only for recognition, but to also create and store value as brand equity to the benefit of the organization's stakeholders and customers. Accordingly, as used herein, a brand 1142 recommendation broadly refers to an HX enhancement recommendation 1140 whose implementation would likely enhance a customer's perception of an organization's brand equity. As likewise used herein, brand equity broadly refers to the value of a brand based upon how important a customer views that brand.

As an example, a computer manufacturer may receive customer input related to their preference for purchasing products from organizations that are ecologically sensitive. In particular, concerns may be expressed that the manufacturer may use certain non-biodegradable packaging materials that could eventually end up in the ocean and adversely affect sea life. However, the manufacturer may actually use biodegradable packaging materials for all of its products, but has failed to promote this fact. Accordingly, a brand 1142 recommendation may be generated suggesting that the manufacturer more actively promote the fact they use biodegradable packaging materials to not only protect sea life, but the environment as a whole. As a result, customer perception of the computer manufacturer being ecologically sensitive is likely to be improved, which in turn may lead to an enhanced customer relationship.

As used herein, a product design 1144 recommendation broadly refers to an HX enhancement recommendation 1140 that addresses certain product design objectives. In various embodiments, the product design 1144 recommendation solution may meet certain product design objectives set by the seller of the product, the prospective buyer of the product, a current customer of the product, or a combination thereof. As an example, a customer may believe that the current design of a product they currently own, such as an automobile, has become dated, and as a result has begun to experience growing dissatisfaction with the automobile's manufacturer. In fact, the customer may be considering automobiles produced by other manufacturers they believe have a more contemporary or exciting design. In this example, the product design 1144 recommendation may be to have the manufacturer take a more aggressive approach in their future design efforts in order to retain current, and attract additional, customers. As a result, customer perception of the manufacturer producing more innovative, or forward-looking, automobile designs may lead to an enhanced customer relationship.

As used herein, a product feature 1146 recommendation broadly refers to an HX enhancement recommendation 1140 that addresses certain product feature objectives. In various embodiments, the product feature 1146 recommendation may meet certain product feature objectives set by the seller of the product, the prospective buyer of the product, a current customer of the product, or a combination thereof. As an example, a data center customer may have purchased Gigabit switches from a vendor in the past.

In this example, the customer may have a need to add 192 additional Ethernet switch ports, split equally between four equipment racks, to service anticipated growth in their user base. Furthermore, the customer would prefer to have the ports support Ethernet network speeds of up to ten gigabits per second (10 Gigabit) to provide higher throughput in the future. However, the switches the vendor currently provides only support Gigabit Ethernet speeds. As a result, despite having a good experience with the vendor in the past, the customer is now considering products from other vendors.

Accordingly, the product feature 1146 recommendation may be for the vendor to add 10 Gigabit Ethernet switches to their product line. To continue the example, the product feature 1144 recommendation may further recommend the provision of two configurations of 10 Gigabit Ethernet switches, one with 48 ports and the other with 24 ports. Accordingly, the product feature 1146 recommendation meets the product feature objectives of the customer, but more importantly, having the flexibility of choosing between two product configurations, both of which support 10 Gigabit Ethernet speeds, enhances the customer's HX perception of the vendor.

As used herein, a support 1148 recommendation broadly refers to an HX enhancement recommendation 1140 that addresses certain product or service support objectives. In various embodiments, the support 1148 recommendation may meet certain product or service support objectives set by the seller of the product or service, the prospective buyer of the product or service, a current customer of the product or service, or a combination thereof. As an example, a manufacturer of computer servers may offer free call center and online support for their products from 7:00 AM to 7 PM weekdays as part of their service offering. However wait times for both types of support have gradually been increasing over the past few months and the current average wait time is approaching a half hour, which is impractical for large customers whose business success relies on quick resolution of issues.

In this example, one or more customers may have provided customer input, described in greater detail herein, suggesting they would be willing to pay for expedited service, especially if the hours of support were increased from 6:00 AM to 12:00 PM, seven days a week. Accordingly, the support 1148 recommendation in this example may be to provide an enhanced service offering for an additional charge that not only increases the hours call center and online product support is offered, but with a service level agreement (SLA) guaranteeing wait times of no more than ten minutes. As a result, the support 1148 recommendation meets the original product support objectives of the customer, but just as importantly, delivers more than they were anticipating by providing a guaranteed wait time of ten minutes. Furthermore, the customer's HX is likely improved, which in turn may lead to a enhancing the customer's perception of the computer manufacturer being sensitive to the needs of their business.

As used herein, an operational 1150 recommendation broadly refers to an HX enhancement recommendation 1140 that addresses certain operational objectives. AS used herein, the term "operational" broadly refers to any operation, function, procedure, activity, process, and so forth enacted by an organization, or a customer of a product or service the organization may provide. In various embodiments, the support 1148 recommendation may meet certain operational objectives set by the seller of the product or service, the prospective buyer of the product or service, a current customer of the product or service, or a combination thereof.

To continue the preceding example, the manufacturer of computer servers may push driver updates to their installed base of servers throughout the day. However, several datacenter customers have provided customer input that unexpected driver updates are disruptive to their business operations. In addition, these same customers have consistently suggested that driver updates be made according to a predefined schedule.

In this example, the operational 1150 recommendation is for the computer manufacturer to offer customers of their servers the option of designating which servers in their installed base receive driver updates, at what time, and how often, according to a mutually agreeable, published schedule. Accordingly, the operational 1150 recommendation meets the customer's objective of not having their business operations unpredictably disrupted while having the assurance that drivers will be kept up to date according to a known schedule. As a result, the customer's perception of the manufacturer being sensitive to their operational needs is likely improved, which in turn may lead to an enhanced customer relationship.

As used herein, a financial 1152 recommendation broadly refers to an HX enhancement solution 1140 that addresses certain financial objectives. In various embodiments, the financial 1152 recommendation may meet certain financial objectives set by the seller of a product, a customer of the product, or a combination thereof. To continue a previous example, the vendor of Ethernet switches may follow a sales philosophy of achieving maximum financial value from a customer, even if that achievement is over time. Likewise, the operator of the datacenter may wish to limit how much they expend on infrastructure expansion at any particular point in time. Furthermore, while the cost of a 48 port 10 Gigabit switch is only 50% higher than a 24 port switch, the data center owner may not need to add all 192 Ethernet ports at one time.

Accordingly, a financial 1152 solution may entail the vendor proposing the sale of eight 24 port switches, in two groups of four, as growth in the data center's user base justifies the expenditure. As a result, the financial objectives of both the vendor and the data center operator are met. The vendor maximizes the financial value of their customer as more revenue will be realized in total due to the higher sales price of eight 24 port switches compared to the cost of four 48 port switches. Likewise, the data center operator can align the cost of expanding their infrastructure to the growth of their user base. Accordingly, the customer's experience with the vendor is not only improved initially, but over the course of the customer relationship as well.

In certain embodiments, two or more individual HX enhancement recommendations 1140 may be combined, in whole or in part, to generate a custom recommendation 1154. As an example, certain aspects of a financial 1152 recommendation may be combined with certain aspects of a product feature 1146 recommendation to generate a custom 1154 recommendation that provides a trade-off between cost and performance. Skilled practitioners of the art will recognize many such embodiments of HX enhancement recommendations 1140, and associated examples or their implementation, are possible. Accordingly, the foregoing is not intended to limit the spirit, scope, or intent of the invention.

In various embodiments, generation of a particular HX enhancement solution 1140 may result in its implementation 1162. In various embodiments, implementation of a particular HX enhancement solution 1140 may involve the provision of certain HX enhancement content by HX personnel 1160, such as a salesperson, customer service representative, product designer, marketer, and so forth. Examples of such HX enhancement content include various forms of sales collateral, product and service presentations, sales proposals, questionnaires and other content used to convey, or receive, product or other HX-related information to or from prospective and existing customers. In various embodiments, the HX enhancement content may be implemented to include certain HX enhancement guidance to HX personnel 1160 at various stages of a customer relationship lifecycle.

As an example, the HX enhancement content may include certain HX-related questions that should be answered before proceeding to the next stage of the customer relationship. As another example, the HX enhancement content may include suggestions regarding which HX enhancement content to provide for HX-related interactions 1164 with an existing or prospective customer, at which stage of the customer relationship, and to whom. As yet another example, the HX enhancement content may include a proposal for one or more products or a request for product or service improvement suggestions.

In various embodiments, customer 1164 interaction 1162 with certain HX enhancement content may lead to an HX enhancement result 1166, described in greater detail herein. In various embodiments, data associated with certain HX enhancement results 1166 may be stored in a repository of HX enhancement data 220, described in greater detail herein. Those of skill in the art will recognize many such examples of HX enhancement content, and how it may be used to enhance a customer's experience, are possible. Accordingly, the foregoing is not intended to limit the spirit, scope or intent of the invention.

In various embodiments, an HX enhancement dashboard 1156 may be implemented to provide certain HX personnel 1160 the ability to manage which HX enhancement content is provided to an existing or prospective customer 1164. In various embodiments, the HX enhancement dashboard 1156 may be implemented to track certain HX interactions 1166 between HX personnel 1060 and customers 1164 throughout their respective customer lifecycles. In various embodiments, the HX enhancement dashboard 1166 may be implemented to allow HX personnel 1160 the ability to provide data associated with certain HX enhancement results 1166 to the HX enhancement system.

In various embodiments, an administrator dashboard 1056 may be implemented to allow an administrator, or HX management, to receive summary and detail information related to which HX enhancement content was used, at what point in time, by certain HX personnel 1160. In various embodiments, summary and detail information related to which HX enhancement content was used, at what point in time, by certain HX 1160 personnel may be stored in the repository of HX enhancement data 220, described in greater detail herein.

In certain embodiments, the use of certain HX enhancement content by various HX 1160 personnel, or its provision to an existing or prospective customer 1164, or both, may cause one or more HX enhancement results 1166. As an example, an existing or prospective customer may request additional information, sales collateral, sales presentations, or support materials related to a particular product they have purchased. As another example, a sale for the product may be closed as a result of providing the HX enhancement content. Conversely, the sale may be lost. Alternatively, the existing or prospective customer may ask for a proposal for a different proposal.

In various embodiments, certain metadata related to which HX enhancement content was used, at what point in time, by certain HX personnel 1160, for which existing or prospective customer, and any associated HX enhancement results 1166, may be stored in the repository of HX enhancement data 220. In certain embodiments, the HX enhancement system 118 may be implemented to use a machine learning engine, as described in greater detail herein, to use such information to enhance other customer's experience throughout their respective customer relationship lifecycle.

As an example, a sale of certain products to an existing or prospective customer with a particular set of needs may have been successful. Accordingly, information related to which HX enhancement content was used may be provided to facilitate sales of the same type of products to existing or prospective customers who have a substantively similar set of needs. Conversely, a sale of certain products to an existing or prospective customer with a particular set of needs may have been unsuccessful. Accordingly, information may be provided to certain HX personnel 1160 to assist in determining which HX enhancement content may be more helpful in closing sales of the same type of products to existing or prospective customers who have a substantively similar set of needs.

Figure 12:
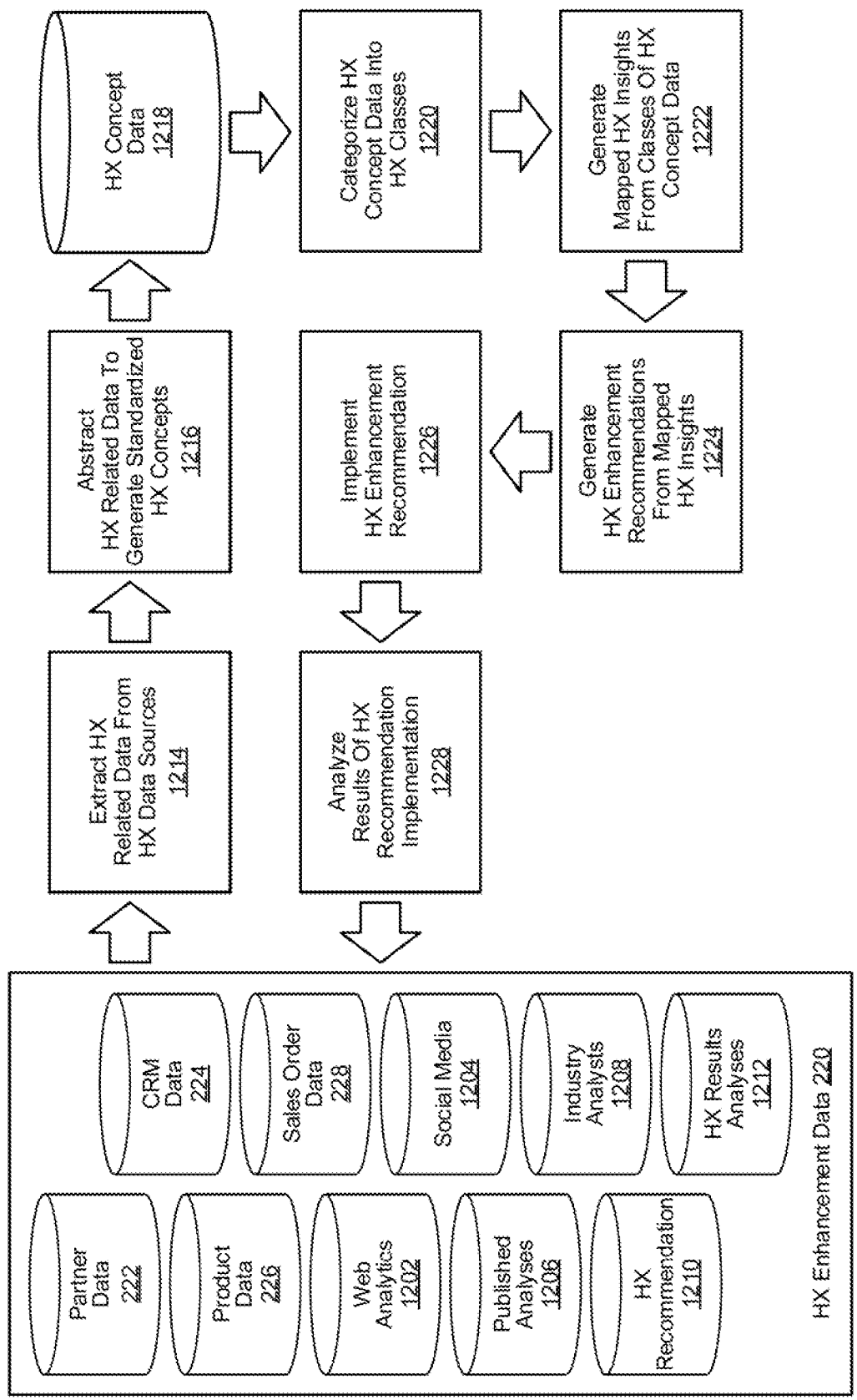
FIG. 12 shows a simplified process flow of HX enhancement result analysis operations.

FIG. 12 shows a simplified process flow of human experience (HX) enhancement result analysis operations implemented in accordance with an embodiment of the invention. In various embodiments, as described in greater detail herein, certain human experience (HX) related data sourced from one or more HX enhancement data sources 220 may be extracted 1214 by an extraction engine during an extraction phase. In these embodiments, the HX related data selected to be extracted 1214 by the extraction engine, and the method by which it is extracted from the sources of HX enhancement data 220 is a matter of design choice. In certain embodiments, the HX enhancement data sources 220 may include repositories of partner 222, customer relationship management (CRM) 224, product 226, sales order 228, web analytics 1202, social media 1204, published analyses 1206, industry analyst 1208, HX recommendation 1210, and HX results analyses 1212 data, or a combination thereof. Those of skill in the art will recognize that many such HX enhancement data sources are possible. Accordingly the foregoing is not intended to limit the spirit, scope, or intent of the invention.

In certain embodiments, the extracted HX related data may then be abstracted 1216, as described in greater detail herein, to generate standardized HX concepts. In various embodiments, as likewise described in greater detail herein, certain natural language processing (NLP) approaches familiar to those of skill in the art may be used to abstract 1216 the standardized X concepts from the extracted HX related data. In certain embodiments, data associated with the resulting standardized HX concepts may then be stored in a repository of HX concept data 1218.

In various embodiments, certain HX concept data stored in the repository of HX concept data 1218 may be retrieved and categorized 1220 into HX concept classes, as described in greater detail herein. In turn, the HX classes may then be processed in certain embodiments to generate mapped 1222 HX insights, as likewise described in greater detail herein. In various embodiments, machine learning approaches familiar to skilled practitioners of the art may be used to generate the mapped 1222 HX insights. In certain embodiments, the HX insights are mapped 1222 as a weighted Cartesian scatter plot, with the relative relevance, or importance, or a combination of the two, depicted by the relative size of their visual representation. As likewise described in greater detail herein, the resulting mapped HX insights may then be processed in certain embodiments to generate one or more HX enhancement recommendations 1224.

In certain embodiments, the resulting HX enhancement recommendations may be implemented 1226 as the result of one or more HX enhancement operations, described in greater detail herein. In turn, the results of implementing the HX enhancement recommendations may be analyzed 1228 in certain embodiments to determine their efficacy. In certain embodiments, data associated with the analysis of the efficacy of analyzing 1228 results of implementing the HX enhancement recommendations may be stored in the repository of HX results analyses 1212. In certain embodiments, the process may be iteratively repeated. In these embodiments, the number of process iterations is a matter of design choice.

As will be appreciated by one skilled in the art, the present invention may be embodied as a method, system, or computer program product. Accordingly, embodiments of the invention may be implemented entirely in hardware, entirely in software (including firmware, resident software, microcode, etc.) or in an embodiment combining software and hardware. These various embodiments may all generally be referred to herein as a "circuit," "module," or "system." Furthermore, the present invention may take the form of a computer program product on a computer-usable storage medium having computer-usable program code embodied in the medium.

Any suitable computer usable or computer readable medium may be utilized. The computer-usable or computer-readable medium may be, for example, but not limited to, an electronic, magnetic, optical, electromagnetic, infrared, or semiconductor system, apparatus, or device. More specific examples (a non-exhaustive list) of the computer-readable medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, or a magnetic storage device. In the context of this document, a computer-usable or computer-readable medium may be any medium that can contain, store, communicate, or transport the program for use by or in connection with the instruction execution system, apparatus, or device.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

Embodiments of the invention are described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The present invention is well adapted to attain the advantages mentioned as well as others inherent therein. While the present invention has been depicted, described, and is defined by reference to particular embodiments of the invention, such references do not imply a limitation on the invention, and no such limitation is to be inferred. The invention is capable of considerable modification, alteration, and equivalents in form and function, as will occur to those ordinarily skilled in the pertinent arts. The depicted and described embodiments are examples only, and are not exhaustive of the scope of the invention.

Consequently, the invention is intended to be limited only by the spirit and scope of the appended claims, giving full cognizance to equivalents in all respects.

What is claimed is:

1. A computer-implementable method for performing a human experience operation within a human experience enhancement environment, the human experience enhancement environment comprising a human experience enhancement system and a human experience data source, the human experience enhancement system comprising an extraction engine, an analysis engine and a results engine, comprising:

performing an extraction operation via an extraction engine, the extraction engine extracting human experience related data from the human experience data source, the extraction operation receiving the human experience related data and abstracting the human experience related data into standardized human experience concepts and categorized human experience concepts;

performing an analysis operation via the analysis engine, the analysis engine receiving the categorized corresponding concepts and mapping the categorized human experience concepts to human experience enhancement objectives to provide a mapped human experience insight, the mapped human experience insight comprising a human experience insight, the human experience insight comprising information associated with how to enhance a relationship of a customer with an organization during a lifecycle of a customer relationship between the customer and the organization; and, providing the mapped human experience insight to the results engine, the results engine using the mapped human experience insight generate a human experience recommendation, the human experience recommendation comprising a proposed course of action to enhance a human experience of the customer to provide a human experience result, the human experience result enhancing the human experience of the customer with the organization; and wherein the human experience of the customer includes a customer experience of the customer and a user experience of the customer, the customer experience of the customer reflecting a holistic perception of the organization based upon interactions throughout a lifecycle of a customer relationship, the user experience of the customer reflecting an attitude of the customer about using a particular product, system or service of the organization; and, the human experience of the customer refers to characteristics of the customer that shape what the customer expects from the organization, the human experience of the customer being based at least in part on the customer experience of the customer and the user experience of the customer.

2. The method of claim 1, further comprising:

iterating the analysis operation to generate a refined mapped human experience insight.

3. The method of claim 1, wherein:

the analysis operation applies a ranked hierarchy of standardized human experience concepts when providing the mapped human experience insight.

4. The method of claim 1, wherein:

the analysis operation includes plotting a plurality of human experience insights via a scatter plot; and, identifying the mapped human experience insight based upon the scatter plot.

5. The method of claim 4, wherein:

the scatter plot comprises a weighted Cartesian scatter plot.

6. The method of claim 5, wherein:

a relative importance of each of the plurality of human experience insights is indicated by a respective location of each insight on the weighted Cartesian scatter plot and a proportional size of a depiction of each insight on the weighted Cartesian scatter plot.

7. A system comprising:

a processor;

a data bus coupled to the processor; and a non-transitory, computer-readable storage medium embodying computer program code for performing a human experience operation within a human experience enhancement environment, the human experience enhancement environment comprising a human experience enhancement system and a human experience data source, the human experience enhancement system comprising an extraction engine, an analysis engine and a results engine, the non-transitory, computer-readable storage medium being coupled to the data bus, the computer program code interacting with a plurality of computer operations and comprising instructions executable by the processor and configured to provide:

performing an extraction operation via an extraction engine, the extraction engine extracting human experience related data from the human experience data source, the extraction operation receiving the human experience related data and abstracting the human experience related data into standardized human experience concepts and categorized human experience concepts;

performing an analysis operation via the analysis engine, the analysis engine receiving the categorized corresponding concepts and mapping the categorized human experience concepts to human experience enhancement objectives to provide a mapped human experience insight, the mapped human experience insight comprising a human experience insight, the human experience insight comprising information associated with how to enhance a relationship of a customer with an organization during a lifecycle of a customer relationship between the customer and the organization; and, providing the mapped human experience insight to the results engine, the results engine using the mapped human experience insight generate a human experience recommendation, the human experience recommendation comprising a proposed course of action to enhance a human experience of the customer to provide a human experience result, the human experience result enhancing the human experience of the customer with the organization; and wherein the human experience of the customer includes a customer experience of the customer and a user experience of the customer, the customer experience of the customer reflecting a holistic perception of the organization based upon interactions throughout a lifecycle of a customer relationship, the user experience of the customer reflecting an attitude of the customer about using a particular product, system or service of the organization; and, the human experience of the customer refers to characteristics of the customer that shape what the customer expects from the organization, the human experience of the customer being based at least in part on the customer experience of the customer and the user experience of the customer.

8. The system of claim 7, wherein the instructions executable by the processor are configured for:

iterating the analysis operation to generate a refined mapped human experience insight.

9. The system of claim 7, wherein the instructions executable by the processor are configured for:

the analysis operation applies a ranked hierarchy of standardized human experience concepts when providing the mapped human experience insight.

10. The system of claim 7, wherein:

the analysis operation includes plotting a plurality of human experience insights via a scatter plot; and, identifying the mapped human experience insight based upon the scatter plot.

11. The system of claim 10, wherein:

the scatter plot comprises a weighted Cartesian scatter plot.

12. The system of claim 11, wherein:

a relative importance of each of the plurality of human experience insights is indicated by a respective location of each insight on the weighted Cartesian scatter plot and a proportional size of a depiction of each insight on the weighted Cartesian scatter plot.

13. A non-transitory, computer-readable storage medium embodying computer program code for performing a human experience operation within a human experience enhancement environment, the human experience enhancement environment comprising a human experience enhancement system and a human experience data source, the human experience enhancement system comprising an extraction engine, an analysis engine and a results engine, the computer program code comprising computer executable instructions configured for:

performing an extraction operation via an extraction engine, the extraction engine extracting human experience related data from the human experience data source, the extraction operation receiving the human experience related data and abstracting the human experience related data into standardized human experience concepts and categorized human experience concepts;

performing an analysis operation via the analysis engine, the analysis engine receiving the categorized corresponding concepts and mapping the categorized human experience concepts to human experience enhancement objectives to provide a mapped human experience insight, the mapped human experience insight comprising a human experience insight, the human experience insight comprising information associated with how to enhance a relationship of a customer with an organization during a lifecycle of a customer relationship between the customer and the organization; and, providing the mapped human experience insight to the results engine, the results engine using the mapped human experience insight generate a human experience recommendation, the human experience recommendation comprising a proposed course of action to enhance a human experience of the customer to provide a human experience result, the human experience result enhancing the human experience of the customer with the organization; and wherein the human experience of the customer includes a customer experience of the customer and a user experience of the customer, the customer experience of the customer reflecting a holistic perception of the organization based upon interactions throughout a lifecycle of a customer relationship, the user experience of the customer reflecting an attitude of the customer about using a particular product, system or service of the organization; and, the human experience of the customer refers to characteristics of the customer that shape what the customer expects from the organization, the human experience of the customer being based at least in part on the customer experience of the customer and the user experience of the customer.

14. The non-transitory, computer-readable storage medium of claim 13, wherein the computer executable instructions are configured for:
iterating the analysis operation to generate a refined mapped human experience insight.

15. The non-transitory, computer-readable storage medium of claim 13, wherein the computer executable instructions are configured for:
the analysis operation applies a ranked hierarchy of standardized human experience concepts when providing the mapped human experience insight.

16. The non-transitory, computer-readable storage medium of claim 13, wherein:
the analysis operation includes plotting a plurality of human experience insights via a scatter plot; and,
identifying the mapped human experience insight based upon the scatter plot.

17. The non-transitory, computer-readable storage medium of claim 16, wherein:
the scatter plot comprises a weighted Cartesian scatter plot.

18. The non-transitory, computer-readable storage medium of claim 17, wherein:
a relative importance of each of the plurality of human experience insights is indicated by a respective location of each insight on the weighted Cartesian scatter plot and a proportional size of a depiction of each insight on the weighted Cartesian scatter plot.

19. The non-transitory, computer-readable storage medium of claim 13, wherein:
the computer executable instructions are deployable to a client system from a server system at a remote location.

20. The non-transitory, computer-readable storage medium of claim 13, wherein:
the computer executable instructions are provided by a service provider to a user on an on-demand basis.

\* \* \* \* \*